United States Patent [19]
Suzuki et al.

[11] Patent Number: 5,982,379
[45] Date of Patent: Nov. 9, 1999

[54] INTERACTIVE COLOR SYSTEM EDITOR AND METHOD OF SPECIFYING POTABLE COLOR SYSTEM FRAMEWORK REPRESENTATION

[75] Inventors: Koichi Suzuki, Kanagawa; Yusuke Ohta, Yokohama; Noboru Murayama, Tokyo, all of Japan

[73] Assignee: Ricoh Company, Ltd., Tokyo, Japan

[21] Appl. No.: 08/869,074

[22] Filed: Jun. 4, 1997

[30] Foreign Application Priority Data

Jun. 4, 1996 [JP] Japan .................................. 8-141977
Jul. 8, 1996 [JP] Japan .................................. 8-178259

[51] Int. Cl.⁶ .................................................. G06F 15/00
[52] U.S. Cl. ........................ 345/431; 345/441; 345/442; 345/440
[58] Field of Search .................................. 345/431, 440, 345/442, 421, 441

[56] References Cited

U.S. PATENT DOCUMENTS 4,893,181  1/1990  Yeomans .................................... 358/80

OTHER PUBLICATIONS

"CorelDraw", Corel Corporation, Chapter 5, p. 406, 1993.

*Primary Examiner*—Mark K. Zimmerman
*Assistant Examiner*—Chanté Harrison
*Attorney, Agent, or Firm*—Knoble & Yoshida LLC

[57] ABSTRACT

A system for and a method visualizes a color system for specifying a portable color system representation. The portable color system representation does not require a large table or a large amount of calculation. The same system and the method allows the user to interactively edit each of color components of a given color system so as to generate a portable color system framework representation between unrelated devices whose input and output ranges are different.

37 Claims, 10 Drawing Sheets

3 POINT – QUADRATIC EQUATION

STARTING POINT : (0, 0), (0, 0.5)
MIDDLE POINT : (0.4, 0.6), (0.7, 0.4)
ENDING POINT : (1, 0.5), (1,1)

3-POINT-2-SLOPE-4th-DEGREE EQUATION

STARTING POINT : (0, 0), (0, 0.5)
ENDING POINT : (1, 0.5), (1, 1)
MIDDLE POINTS : (0.4, 0.67), (0.6, 0.33)
SLOPE AT THE STARTING POINT : $t_a$ = 0.5, 1.5
SLOPE AT THE ENDING POINT : $t_e$ = 0.5, 1.5

5-POINT 4th-DEGREE EQUATION

STARTING POINT : (0,0)
ENDING POINT : (1,1)
MIDDLE POINT NO. 1 : (0.3, 0.3), (0.2, 0.5)
MIDDLE POINT NO. 2 : (0.4, 0.4)
MIDDLE POINT NO. 3 : (0.8, 0.4), (0.8, 0.7)

5-POINT 2-SLOPE 6th DEGREE EQUATION

STARTING POINT : (0, 0), (0, 0.5)
ENDING POINT : (1, 0.5), (1, 1)
MIDDLE POINT No. 1 : (0.25, 0.33), (0.25, 0.67)
MIDDLE POINT No. 2 : (0.5, 0.5)
MIDDLE POINT No. 3 : (0.75, 0.33), (0.75, 0.67)
SLOPE AT THE STARTING POINT : $t_a$ = 0.5, 1.5
SLOPE AT THE STARTING POINT : $t_e$ = 0.5, 1.5

INTERACTIVE COLOR SYSTEM EDITOR AND METHOD OF SPECIFYING POTABLE COLOR SYSTEM FRAMEWORK REPRESENTATION

FIELD OF THE INVENTION

The current invention is generally related to a system for and a method of visualizing a color system representation, and more particularly related to a system for and a method of interactively editing each of color components of a given color system so as to generate a portable color system framework representation for unrelated devices whose input and output ranges are different.

BACKGROUND OF THE INVENTION

In order to compensate for input/output (I/O) characteristics, image information generally needs to be corrected. To input image information, a given input device such as a scanner has a particular set of input characteristics for red, green and blue (RGB). For example, certain scanners are more sensitive to a red input than a green input while certain other scanners do not have the above input characteristics. Due to these device dependent characteristics, the RGB image information scanned by one scanner would not be necessarily compatible with other RGB information inputted by another scanner. Similarly, to output an image information, a given printer has a particular set of output characteristics for cyan, magenta, yellow and black (CMYK), and due to these characteristics, the image information would not be compatible with other CMYK image information to be outputted by a different printer. Because of the above described device dependent characteristics, these input and output information are corrected so as to make them compatible between devices.

In order to correct the device dependent image information, a correction curve was used in prior art. A typical correction curve was generated by a function whose input and output values had predetermined ranges. The functions included gamma functions such as $y=x^\gamma$ where $\gamma$ is a selected constant, and both x and y range between 0 and 1. The range between 0 and 1 for the inputs or the outputs was correlated to 64 (6 bits) or 256 (8 bits) color intensity levels. For a given input value x, which might be a RGB value or a CMYK value, a particular corrected output value y was obtained based upon a predetermined function. However, this type of gamma correction functions was rather limited by a single constant parameter which generated a rather uniform curvature. Other prior art gamma functions involved polynomial equations as disclosed by Japanese Patent No 63-2462 and Japanese Patent No 6-105154.

Japanese Patent No 63-2462 discloses a method and a system of correcting image information by a series of adjustments to a curve generated by a polynomial such as a quadratic or cubic equation. The adjustments include a rotation of the curve by a predetermined angle $\theta$ about the origin and a shift of the rotated curve by a predetermined amount in either or both along the X and Y axes. Although these adjustments to the gamma correction curve provide some degree of flexibility, the total number of the parameters necessary for the correction is undesirably large. As a result, additional hardware such as registers and memory is required.

To reduce the number of parameters, Japanese Patent No. 6-105154 (the 154 reference) discloses a Modified-Bezier (MB) curve as a gamma correction curve. The MB curve is expressed as follows:

$$y=cx(1-x)^2+(3-d)(1-x)x^2+x^3$$

where $0 \leq x \leq 1$. The curvature of the above MB curve is adjusted by a pair of parameters c and d. The parameter c determines the slope of a tangential line at the starting point (0,0) while the other parameter d determines the slope of a tangential line at the ending point (1,1). In addition to the above described two-parameter adjustment, the 154 reference also discloses the four-parameter adjustment. For a specified x value, without changing the curvatures specified by c and d (here expressed as $c_1$ and $d_1$), the above MB curve is further adjusted by another pair of parameters $c_2$ and $d_2$, which are defined as follows: $c=c_1+c_2 (1-x) x$ and $d=d_1+d_2 (1-x) x$. Thus, at a point specified by a x value, the curve is further modified in the y direction without modifying the above described original starting and ending slopes of the curve specified by $c_1$ and $d_1$.

In general, due to the complex nature of the corrections, the above described correction has been performed using pre-calculated tables. Since the correction process requires complex equations and a number of parameters, it is impractical to calculate the correction data on the fly during its correction process. Although the pre-calculated table look-up process is more efficient, it is rather limited and lacking flexibility in correcting image information. Furthermore, to handle a large number of variations in the device as well as toner characteristics for a wide range of input and output values, a voluminous amount of pre-calculated data needs to be stored in the table memory. The amount of pre-calculated data is even larger when each color in a color system is independently corrected.

In the relevant prior art of color production technologies involving fax machines, copiers and printers, the image information has been generally corrected based upon the above described input or output characteristics using pre-calculated tables. This is because the prior art correction process is too complex to be performed on the fly or requires additional hardware. The correction process remains to be more efficient so that it is performed on the fly without the use of pre-calculated table.

Japanese Patent Laid Publication 7-162683 disclosed an approach to select an appropriate correction curve from a plurality of predetermined curves depending upon a particular intensity level. For example, one of these correction curves more effectively corrects data in a shadow region or at low intensity while not affecting other data in a highlight region or at high intensity. These correction curves may be user defined. However, these correction curves are not specific to each of color components and are applied uniformly across the color components. As will be more fully explained later, any shade of color is made by mixing color components or primary colors. In the relevant prior art, to allow the color component specific adjustments of the image information, Japanese Patent Laid Publication 8-125865 as well as a U.S. patent application Ser. No. 08/547,499 disclosed a two-step correction process whose first step generates a gamma correction curve based upon a cubic polynomial which is defined by a beginning point, an ending point, three intermediate points as well as two additional parameters $c_2$ and $d_2$. The second correction step customizes the correction process by shifting the standard gamma correction curve by using a simple equation such as y'=a+by, where y is a normalized standard output value based upon the above described gamma correction curve while "a" and "b" are predetermined coefficients. The coefficient "a"

defines y' to be "a" when x=0, and y' is "a+b" when x=1. Although the above described two-step correction process allowed certain customization of the standard gamma correction curve, the customization is rather limited to a predetermined set of parameters and still lacks flexibility.

Japanese Patent Laid Publication Hei 2-92159 discloses a method of generating a tone table or an intensity correction curve based upon the interpolation or splines of a predetermined number of selected points. Although a plurality of tone tables may be applied to a single color image based upon certain characteristics of a given portion of the image, a single tone table is uniformly applied to color components within the same portion.

In the above relevant prior art technologies, the color system specification is addressed as a solution to the same problem. The above described prior art technologies are generally directed to how to faithfully reproduce scanned color information by correcting the color information according to the input and output device characteristics. Rather than correcting the error generated by the input and output devices, it is desired to specify a desired color system so that the input and output devices have the identical input and output characteristics. As a result, the correction process is substantially eliminated. The desired color system can be a standardized color system for these input and output devices. On the other hand, the desired color system can also be a customized color system which is used to adjust the input and output devices. In order to determine the color system specification and to edit it if necessary, a user should be able to manipulate the color system specification in a user-friendly as well as interactive fashion.

In order to provide such a user-friendly tool, visualization of the color system has been used. In general, it is difficult to visualize a color system. Color is made up from color components or primaries. For example, for an additive color system, color is represented by adding three color components or primaries which includes red (R), green (G) and blue (B) to darkness. A color system based upon these three primaries is called the RGB model. On the other hand, in a subtractive color system, cyan, magenta, and yellow are subtracted from white light. Each color component has its own characteristics over a range. Because of the unique set of values over a range, a given color system is specified by a set of multiple characteristics of the color components. To visualize a color system, these sets of characteristics should be separately as well as collectively represented over a predetermined range.

The visualized color system information should be easily specified as well as later customized in a user-friendly manner. A user should be able to specify the color system according to his or her taste via an intuitive control without necessarily knowing the color theories and without requiring large memory space for storing such a user-selected color system specification. In this regard, it is important that the user does not have to perform undue experimentation by adjusting a set of multiple parameters to obtain a desired color system specification.

SUMMARY OF THE INVENTION

To solve the above and other problems, according to one aspect of the current invention, a method of portably specifying a color system having color components, including the steps of: a) determining an input numeric range and an output numeric range for each of the color components, the input numeric range and the output numeric range defining color coordinates for each of the color components; b) selecting a predetermined number of approximation control points in the color coordinates for each of the color components; and c) storing information on the approximation control points, the input numeric range, and the output numeric range for each of the color components, the information defining color system framework information.

According to a second aspect of the current invention, a method of visualizing color system adjustments for a predetermined number of color components, including the steps of: a) displaying a color image to be adjusted according to predetermined initial color characteristics of each of the color components; b) independently visualizing the color characteristics of each of the color components; c) adjusting the color characteristics of at least one of the color components; and d) updating the color image displayed in the step (a) based upon the color characteristics adjusted in the step c).

According to a third aspect of the current invention, a system for portably specifying color having color components, including: a display unit for displaying an input numeric range and an output numeric range for each of the color components, the input numeric range and the output numeric range defining color coordinates for each of the color components; an input unit connected to the display unit for selecting at least a predetermined number of approximation control points in the color coordinates for each of the color components; and a storage unit connected to the input unit for storing information on the approximation control points, the input numeric range and the output numeric range for each of the color components, the information defining color system framework information.

According to a fourth aspect of the current invention, an interactive color system editor for visualizing a color system, the color system having a predetermined number of color components, each of the color components being specified by color characteristics, including: a display unit for displaying a color image based upon the color system to be adjusted; an user interface unit for independently visualizing the color characteristics of each of the color components and for interactively specifying an adjustment in the color characteristics of at least one of the color components; and a control unit connected to the display unit and the user interface unit for processing the adjustment so as to generate a signal which causes the color image to reflect the adjustment in the color characteristics.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
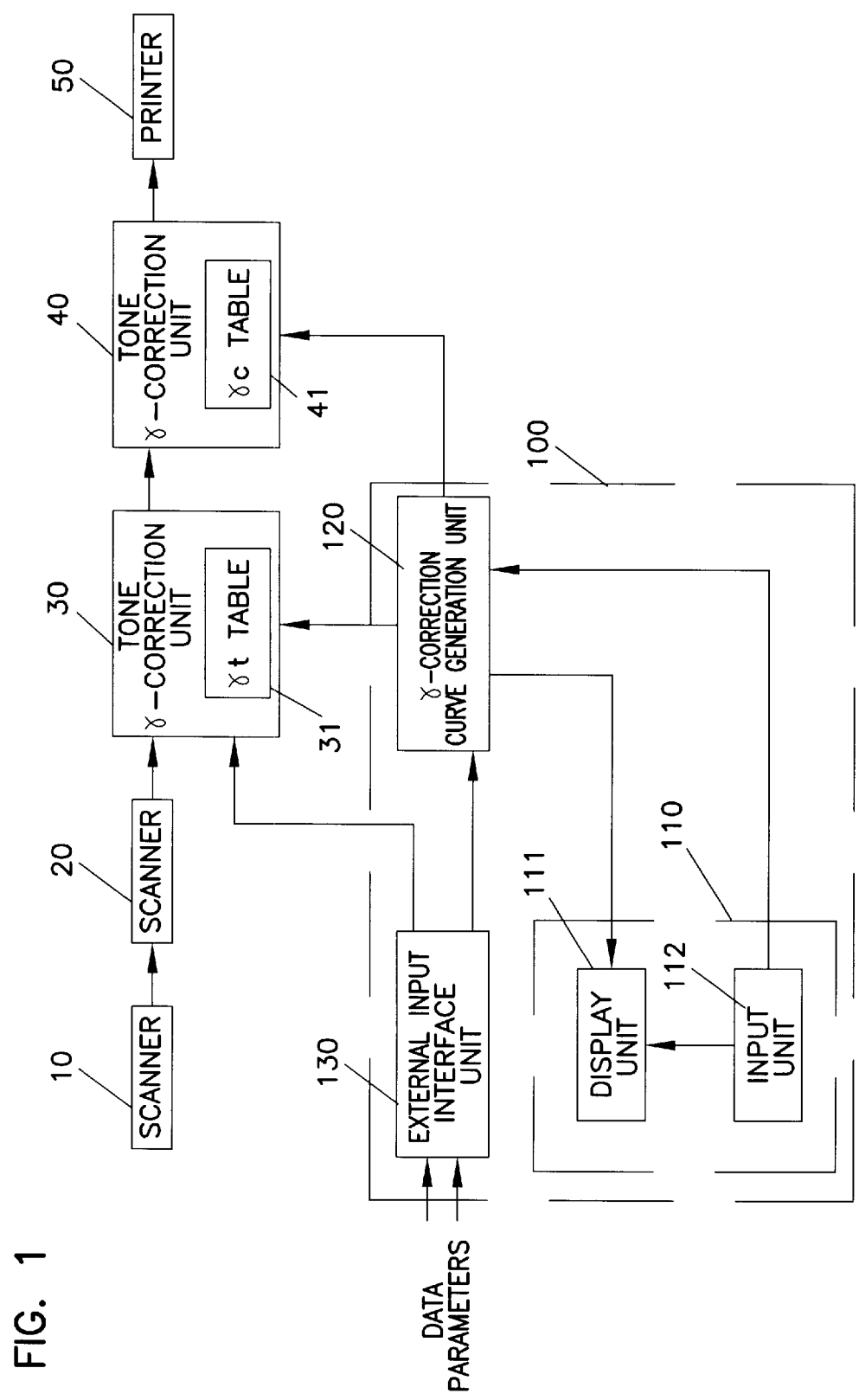
FIG. 1 diagrammatically illustrates the interactive color system editor for visualizing a color system according to the current invention.

Referring now to the drawings, wherein like reference numerals designate corresponding structure throughout the views, and referring in particular to FIG. 1, one preferred embodiment of the interactive color system editor for visualizing a color system according to the current invention is diagrammatically illustrated. The interactive color system editor is a part of an image processing device such as a photocopier, a printer, a facsimile machine and a multifunction unit. A scanner 10 scans an image to generate image data, and an image processing unit 20 initially processes the image data. A tone $\gamma$-correction unit or intensity level correction unit 30 corrects the intensity level of the image data based upon a predetermined $\gamma t$ table 31. Subsequently, a color $\gamma$-correction unit or color balance correction unit 40 further corrects the color balance of the image data based upon a $\gamma c$ table 41. Based upon the corrected image data, a printer 50 generates an image on an image-carrying medium such as paper. Although the $\gamma t$ table 31 and the $\gamma c$ table 41 are respectively included in the tone $\gamma$-correction unit 30 and the color $\gamma$-correction unit 40, these tables may be alternatively located elsewhere.

Still referring to FIG. 1, a control unit 100 includes an operational panel 110, an external input interface unit 130 and a $\gamma$-correction curve generation unit 120. The operational panel 110 further includes a display unit 111 for displaying an input/output curve or a $\gamma$-correction curve as well as an input set key unit 112 for specifying or selecting a certain set of parameters or information for the above described correction curve. Based upon the selected information, the $\gamma$-correction curve generation unit 120 generates a $\gamma$-correction curve. The toner $\gamma$-correction unit 30 and the color $\gamma$-correction unit 40 respectively generates the correction data to be stored in the $\gamma c$ table 31 and the $\gamma c$ table based upon the $\gamma$-correction curve. Although the above description is directed to the correction of input values to generate the output values, the same input and output relation is used to specify the characteristics of a particular color component over the specified range. A plurality of these color component characteristic specifications generally determines a color system. In the alternative, the external input interface unit 130 inputs the parameters and or the image data into the interactive color system editor. The inputted parameters are sent to the $\gamma$-correction curve generation unit 120 while the image data is sent to the toner $\gamma$-correction unit 30. In an alternative embodiment of the interactive color system editor, the control unit 100 is a general purpose small computer.

Figure 2:
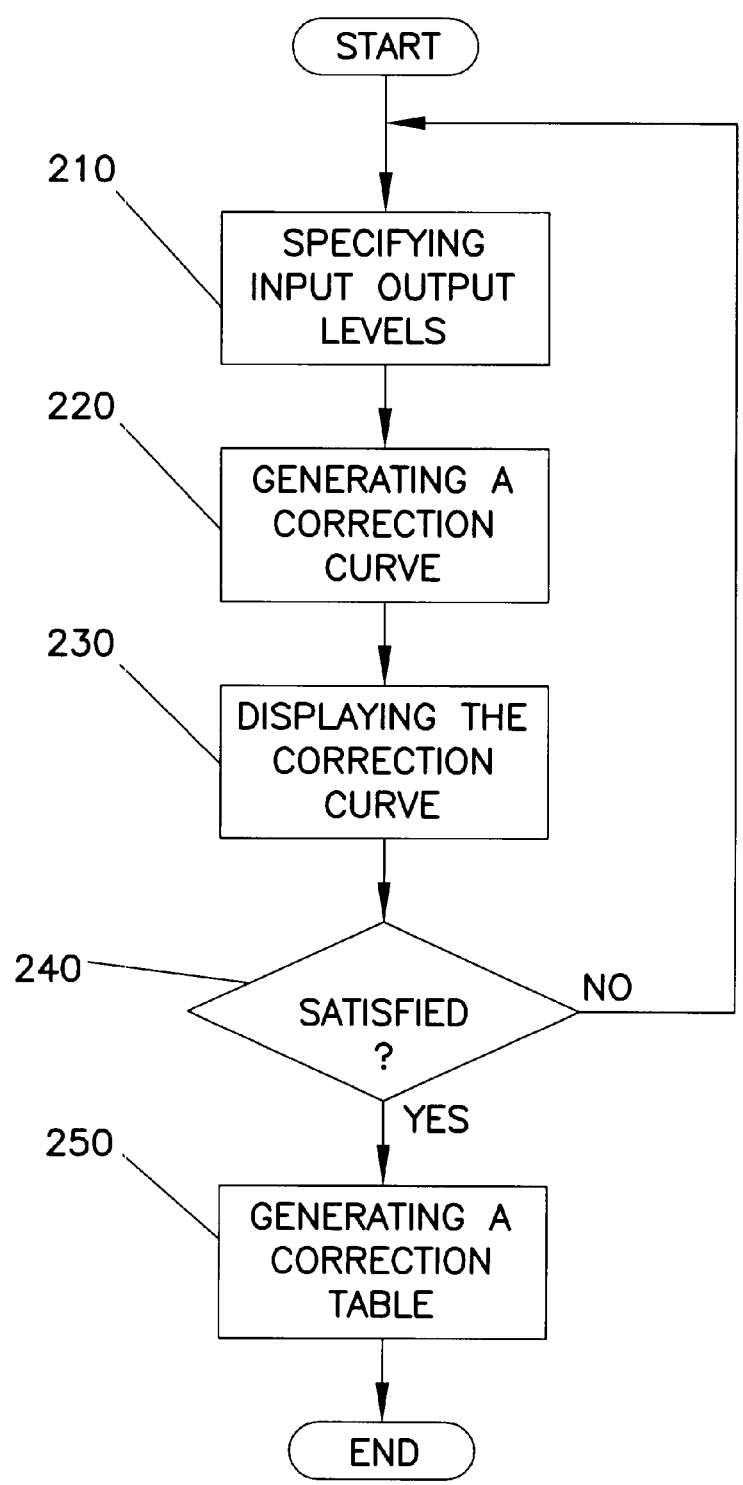
FIG. 2 is a flow chart illustrating steps for specifying and displaying a color correction curve according to the current invention.

Now referring to FIG. 2, a flow chart generally illustrates steps involved in interactively editing or specifying a color system. In a Step 210, input/output levels are specified or existing input/output levels are modified for each of color components of a given color system. One exemplary way is to selects a predetermined number of approximation control points for each of the color components in a coordinate system having a specified input and output range. Each of these control approximation points specifies an input value and a corresponding output value or an intensity value within predetermined input and output ranges. The input and output ranges may be normalized between 0 and 1. Based upon the above specified approximation control points, in a Step 220, a correction curve is generated by a predetermined equation for each of the color components. Optionally, an additional curve is generated for representing the input and output relation of the total color components. In a Step 230, the generated correction curves are displayed within the input and output coordinates. Based upon the shape of the displayed correction curves, it is determined whether the correction curves are used or modified in a Step 240. In addition to displaying the correction curve, an output color image which is corrected by the displayed correction curves is optionally displayed. If the displayed result is not satisfactory, the above described Steps 210, 220 and 230 are repeated. On the other hand, the displayed result is acceptable, based upon the correction curves, a predetermined number of pairs of input and output values are stored for each color component in a correction table in a Step 250.

Figure 3:
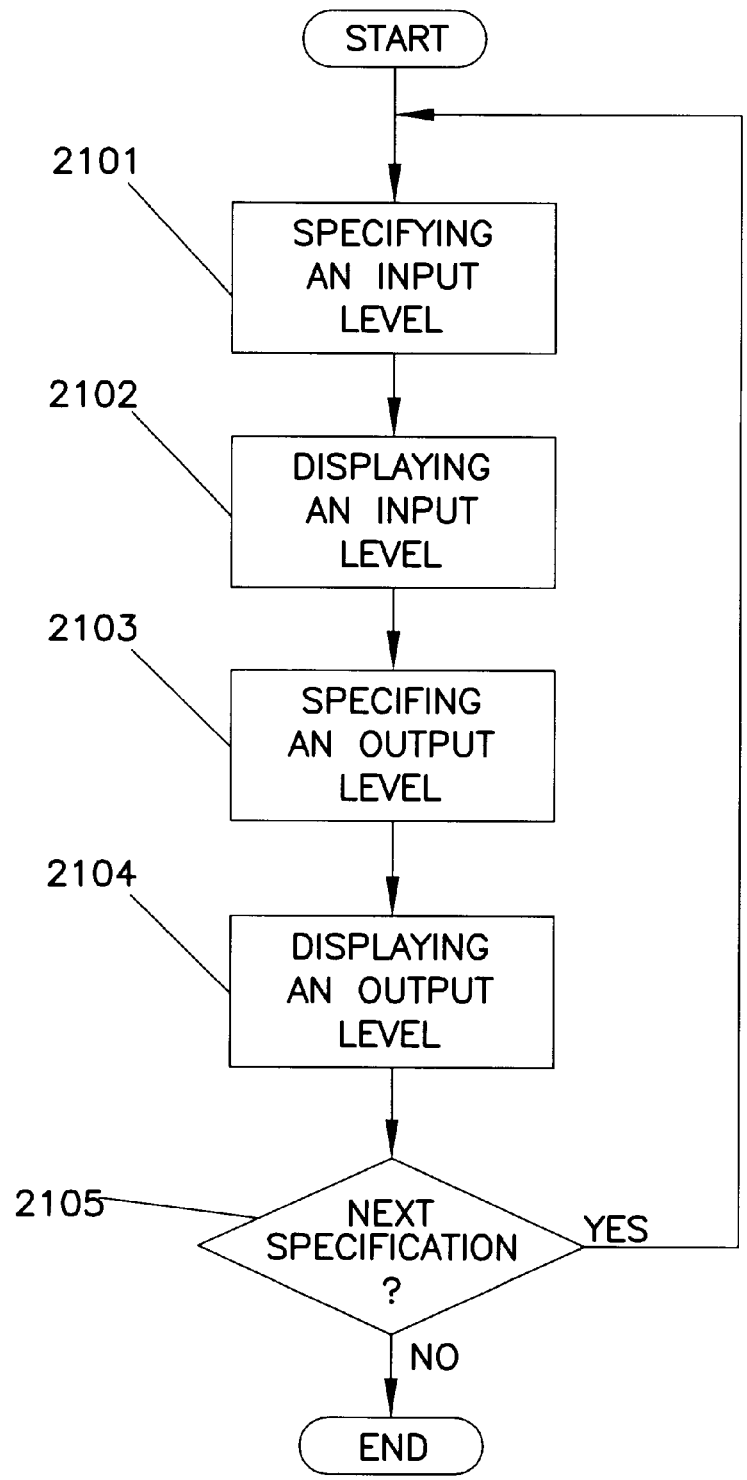
FIG. 3 is a flow chart illustrating certain detailed steps of the flow chart in FIG. 2.

Now referring to FIG. 3, the above described step 210 is further illustrated to specify or edit input/output levels for each of color components of a given color system. One preferred method of inputting the approximation control points is to specify an input level in a Step 2101 and subsequently to display the input level in a Step 2102. Similarly, one preferred method involves a step of specifying a corresponding output level in a Step 2103 and subsequently to display the output level in a Step 2104. Optionally, both input and output values are shown in numeric displays in addition to points along a correction curve in a graphical representation. A series of the input and output pairs is repeated in the above Steps 2101 through 2104 until a specified number of the pairs is reached in a Step 2105.

Figure 4A:
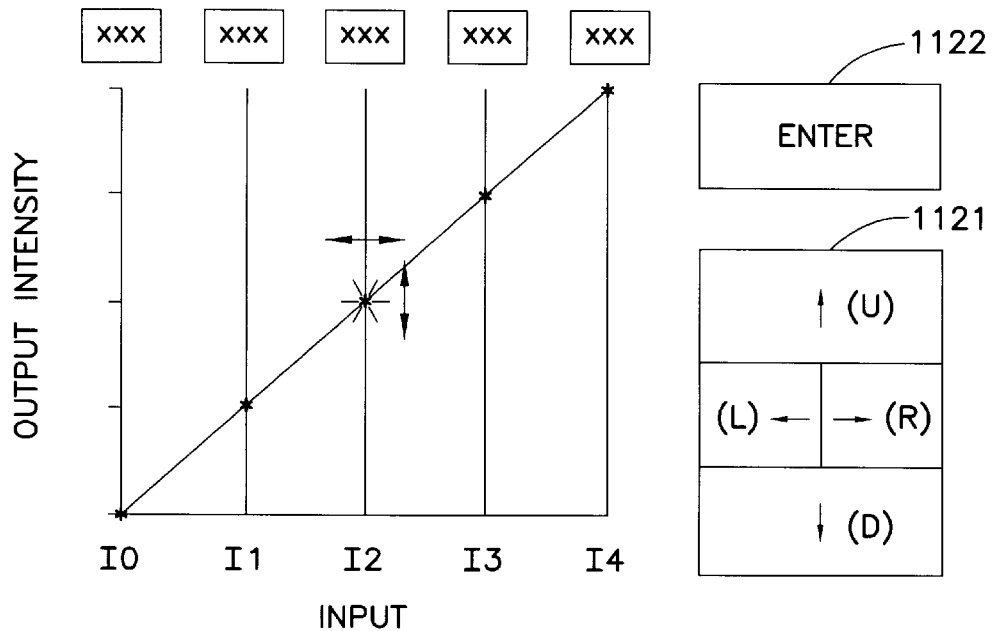
FIGS. 4A and 4B illustrate an example of a display unit and an input unit of the interactive color system editor according to the current invention.

Referring to FIG. 4A, one preferred embodiment of the display and the input units in the interactive color system editor for visualizing a color system according to the current invention is diagrammatically illustrated. In this preferred embodiment, the display unit includes at least an input and output indicator such as a two-dimensional coordinate representation. For example, the input range has five input levels or values marked as I0 through I4. Input values I0 and I4 are respectively a minimum value and a maximum value of the input range. Middle input values I1, I2 and I3 are equally divided values in the input range. The output range has the five output intensity levels or values which correspond to the five input values. Each input value is indicated by an astrict. The input range may be normalized between 0 and 1 or is set to a predetermined range, and the five input values are either defaulted or selected. Similarly, the output values are also initially defaulted or selected. For the sake of simplicity, the input and output values are defaulted to be linear or proportional as indicated by a straight line. Optionally, either the input and or output values are numerically displayed, for example, above the graphical representation. The above described display unit is separately provided for each of the color components. In the alternative, a single display unit displays the input and output characteristics of multiple color components by color coding or other designation.

Figure 4B:
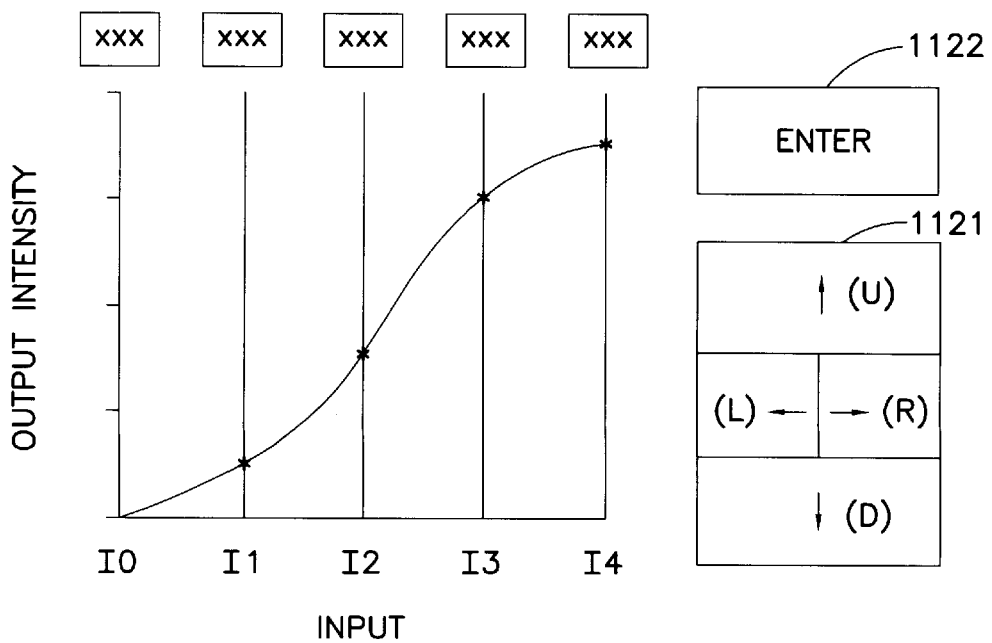

Still referring to FIGS. 4A and 4B, one preferred embodiment of the input unit in the interactive color system editor for visualizing a color system according to the current invention is diagrammatically illustrated. A set of editing keys 1121 includes a up key, a down key, a right key and a left key for moving a specified approximation control point at a desired position in the specified range. In general, the vertical movement of the approximation control point modifies an output value. On the other hand, the horizontal movement of the approximation control point alters an input value. An enter key 1122 confirms the desired position of the specified approximation control point. As a result of some vertical movement of the approximation control points I1 through I4 except for the control point I0, the display unit displays a modified correction curve as illustrated in FIG. 4B.

Figure 5A:
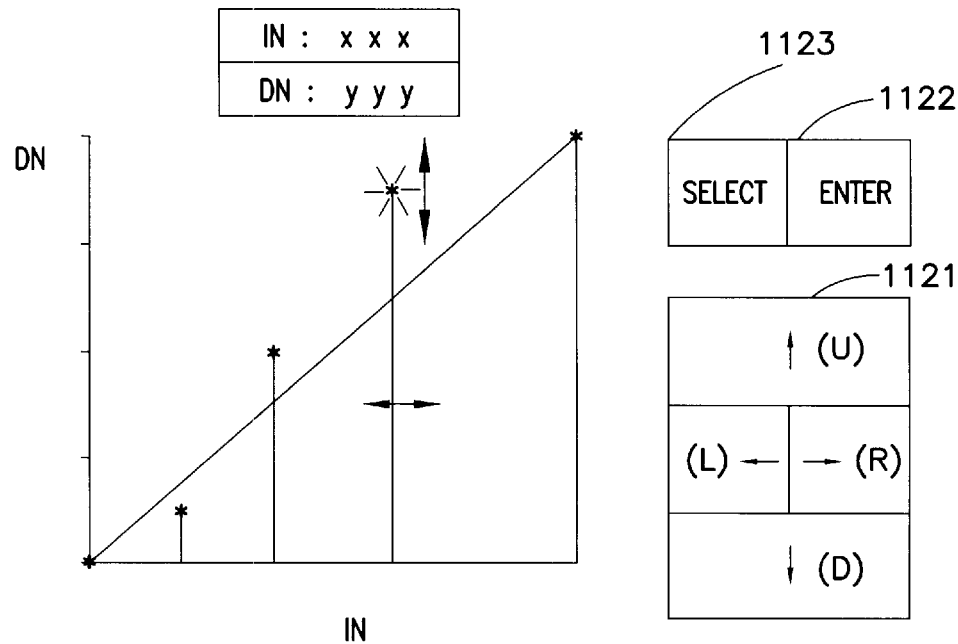
FIGS. 5A and 5B illustrate another example of a display unit and an input unit of the interactive color system editor according to the current invention.
Figure 5B:
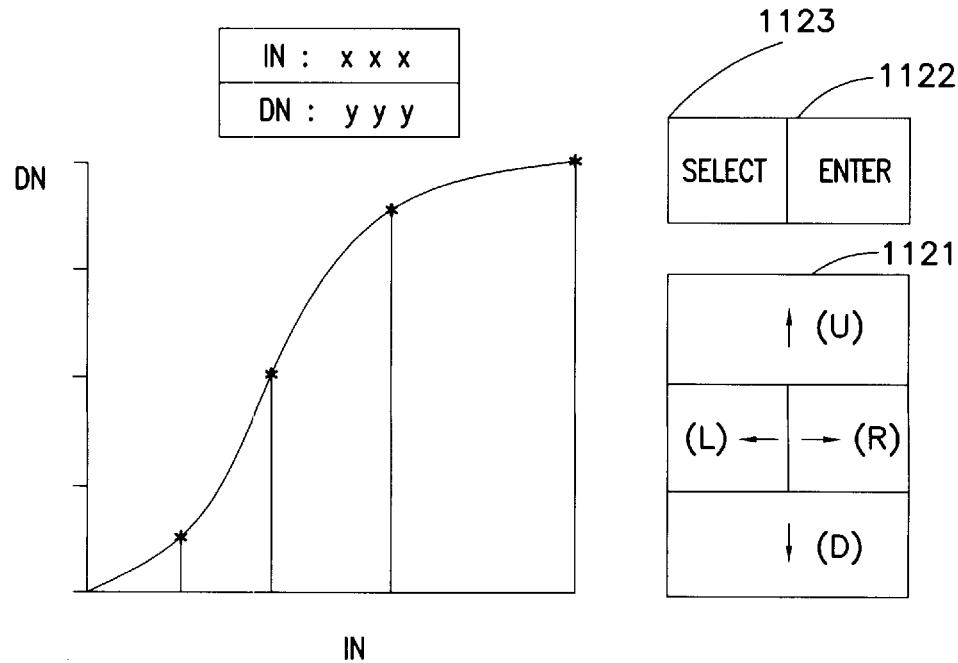

Referring to FIGS. 5A and 5B, an alternative embodiment of the interactive color system editor for visualizing a color system according to the current invention is diagrammatically illustrated. The alternative embodiment includes a single unit which inputs and displays input and output values as well as a correction curve. While FIG. 5A illustrates an initial default setting of the input and output values, FIG. 5B illustrates the result of the customized or edited input and output relation as shown in a correction curve. Although the basic operations on approximation control points are substantially the same as described with respect to FIG. 4A, a select key 1123 allows a user to randomly select one of the approximation control points before modify its input and or output values via a control key panel 1121. The actual implementation of the input unit in the second preferred embodiment includes but is not limited to a touch screen, a pointing device such as a mouse and a screen object such as a pull down menu. Optionally, a selected control point is numerically displayed to accurately determine the input and output relation.

Figure 6:
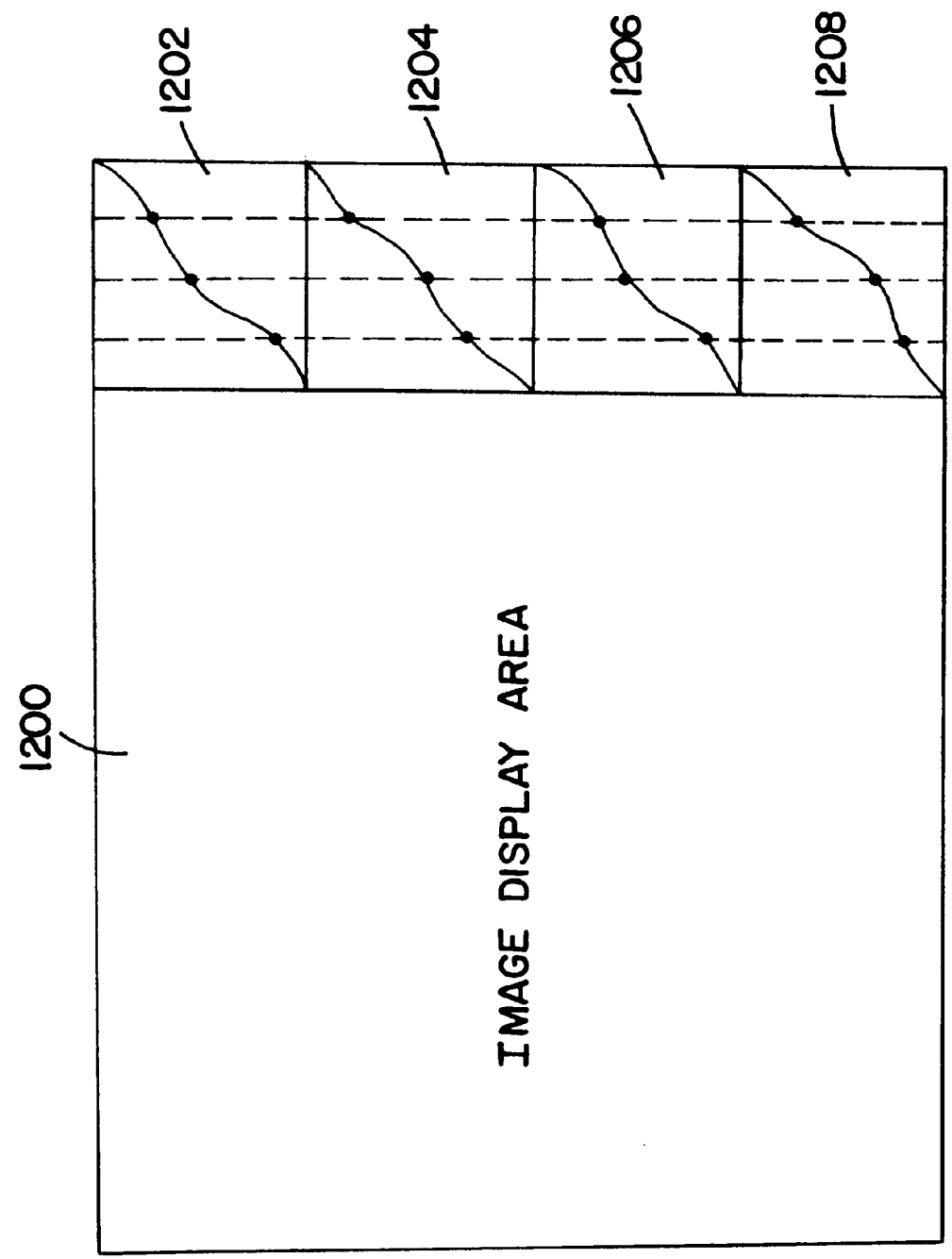
FIG. 6 illustrates yet another example of the interactive color system editor according to the current invention.

Referring to FIG. 6, a second embodiment of the interactive color system editor for visualizing a color system according to the current invention is diagrammatically illustrated. The input and output relation for a color system is determined by specifying the characteristics of an individual color component. For example, the characteristics of the color components are separately displayed. In a tri-stimulus color system such as the RGB model, a first color component unit 1202 displays its characteristics for the first component such as red (R). Similarly, a second and third color component units 1204 and 1206 respectively their characteristics such as green (G) and blue (B). The above described color component units 1202, 1204 and 1206 also function as an input device to specify or edit the characteristic of the respective color components. The operations of specifying or editing the color component characteristics are substantially the same as described above. As the color component characteristics is specified or modified, the color component units 1202, 1204 and 1206 update their corresponding correction curves. Furthermore, an image display area 1200 accordingly displays an image which is either sample or actual based upon the updated correction/specification curves. In addition to the above described color component units 1202, 1204 and 1206, a total color unit 1208 displays the updated overall characteristics of the color system.

In order to generate the above described correction curve based upon a predetermined number of approximation control points each of which specify input/output values, one preferred method according to the current invention involves the determination of a correction curve according to the following equation.

$$y = \sum_{i=0}^{n-1} a_i(1-x)^{n-i-1} x^i \quad (1)$$

where $a_i$ (i=1 to n) is a predetermined number n of parameters at the n pairs of x and y values or input and output values. The parameters $a_i$ generally determine the shape or curvature of the correction curve which determines the correction characteristic.

A predetermined number of pairs of input and output values for each of the color components is stored to specify a desired color system. In general, the above equation y is adjusted by the following equation (2). In response to an input x, y is determined as an output, and both x and y have an range between 0 and 1. When x=0, if a second output y' has an initial value of a while when=1, the second output y' has a+b.

$$y' = a + by \quad (2)$$

The above specified color component curve is efficiently modified by the above translation equation. The equation (2) is useful in converting the above normalized range between 0 and 1 into a device range. For example, such a device range includes 64 gradational or intensity levels for a six-bit signal or 256 gradational or intensity levels for an eight-bit signal.

$$y = f(x)(0 <= x, y <= 1) \quad (3)$$

here f(x) is thus defined as the following conditional polynomial:

$$y = \begin{cases} 0 & ; y < 0 \\ \sum_{i=0}^{n-1} a_i(1-x)^{n-i-1} x^i & ; 0 \le y \le 1 \\ 1 & ; y > 1 \end{cases} \quad (4)$$

Figure 7:
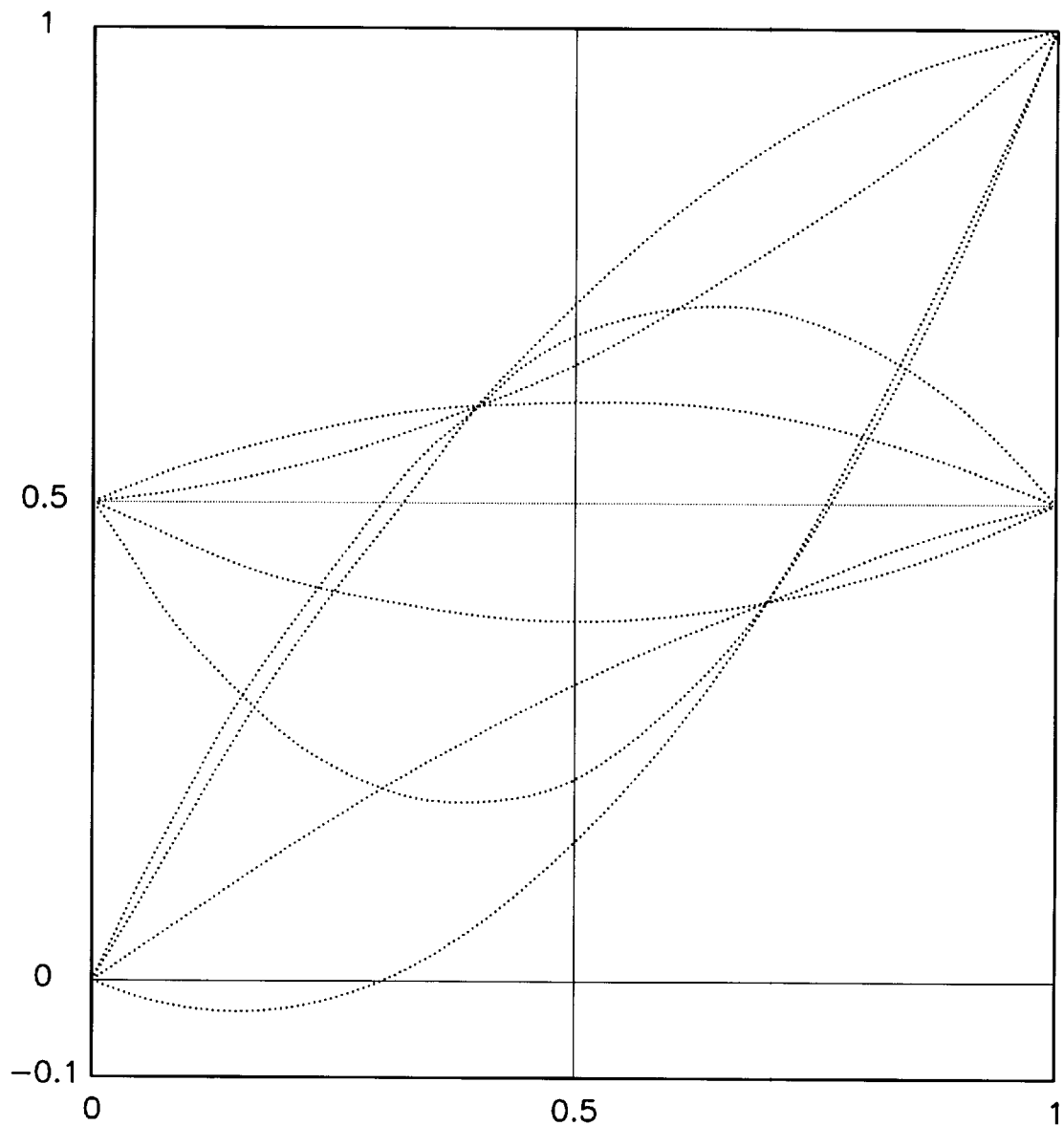
FIG. 7 illustrates exemplary color specification curves which are each defined by three approximation control points.

To illustrate some specific examples of the color component curves, referring to FIG. 7, three points or three pairs of input and output values define the color component characteristics as expressed in the following equation (5):

$$y = a_0(1-x)^2 + a_1(1-x)x + a_2 x^2 \quad (5)$$

where $a_0$, $a_1$ and $a_2$ are defined as follows:

$$a_0 = y_0,$$

$$a_2 = y_2$$

$$a_1 = \frac{1-x_1}{x_1} y_0 + \frac{1}{(1-x_1)x_1} y_1 - \frac{x_1}{1-x_1} y_1$$

In the above example, a starting point is defined by $(0, y_0)$ and has values (0, 0) or (0, 0.5). An ending point is defined by $(1, y_2)$ and has values (1, 0.5) or (1, 1). The middle point is defined by $(x_1, y_1)$ and has values (0.4, 0.6) or (0.7, 0.4).

Figure 8:
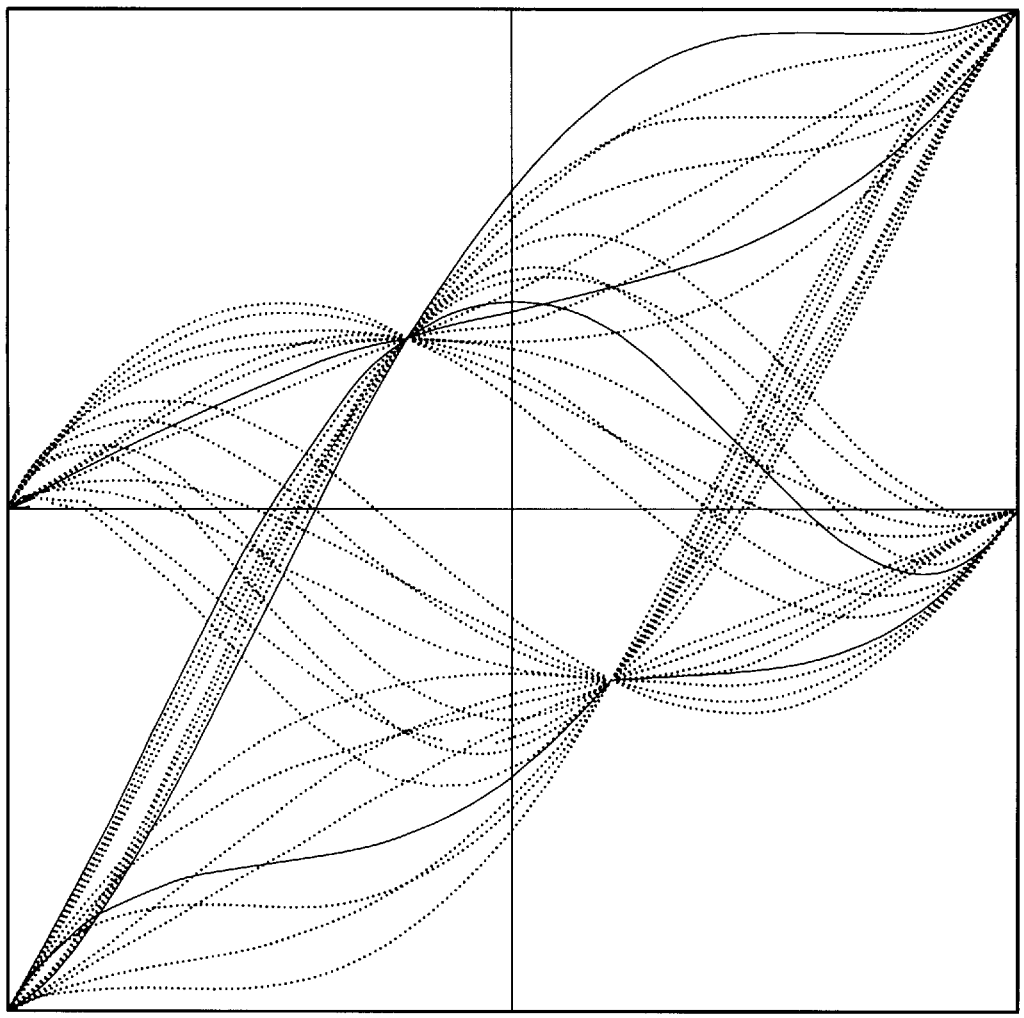
FIG. 8 illustrates exemplary color specification curves which are each defined by three approximation control points and two slopes.

To illustrate another example of the color component curves, referring to FIG. 8, three points as well as two slopes define the color component characteristics as expressed in the following fourth degree equation (6):
where $a_0$, $a_1$, $a_2$, $a_3$ and $_a$ are defined as follows:

$$a_0 = y_0,$$

$$a_4 = y_2$$

$$a_1 = t_a + 4a_0,$$

$$a_3 = 4a_4 - t_e$$

$$a_2 = -\frac{(1-x_1)(1+3x_1)}{x_1^2}y_0 - \frac{(1-x_1)}{x_1}t_e + \frac{1}{(1-x_1)^2 x_1^2}y_1 + \frac{x_1}{(1-x_1)}t_e - \frac{x_1(1+3(1-x_1))}{(1-x-1)^2}y_2$$

In the above example, a starting point is defined by (0, $y_0$) and has values (0, 0) or (0, 0.5). An ending point is defined by (1, $y_2$) and has values (1, 0.5) or (1, 1). The middle point is defined by ($x_1$, $y_1$) and has values (0.4, 0.67) or (0.6, 0.33). In addition, a first slope $t_a$ at the starting point has a value 0.5 or 1.5 while a second slope $t_e$ at the end point has a value 0.5 or 1.5.

Figure 9:
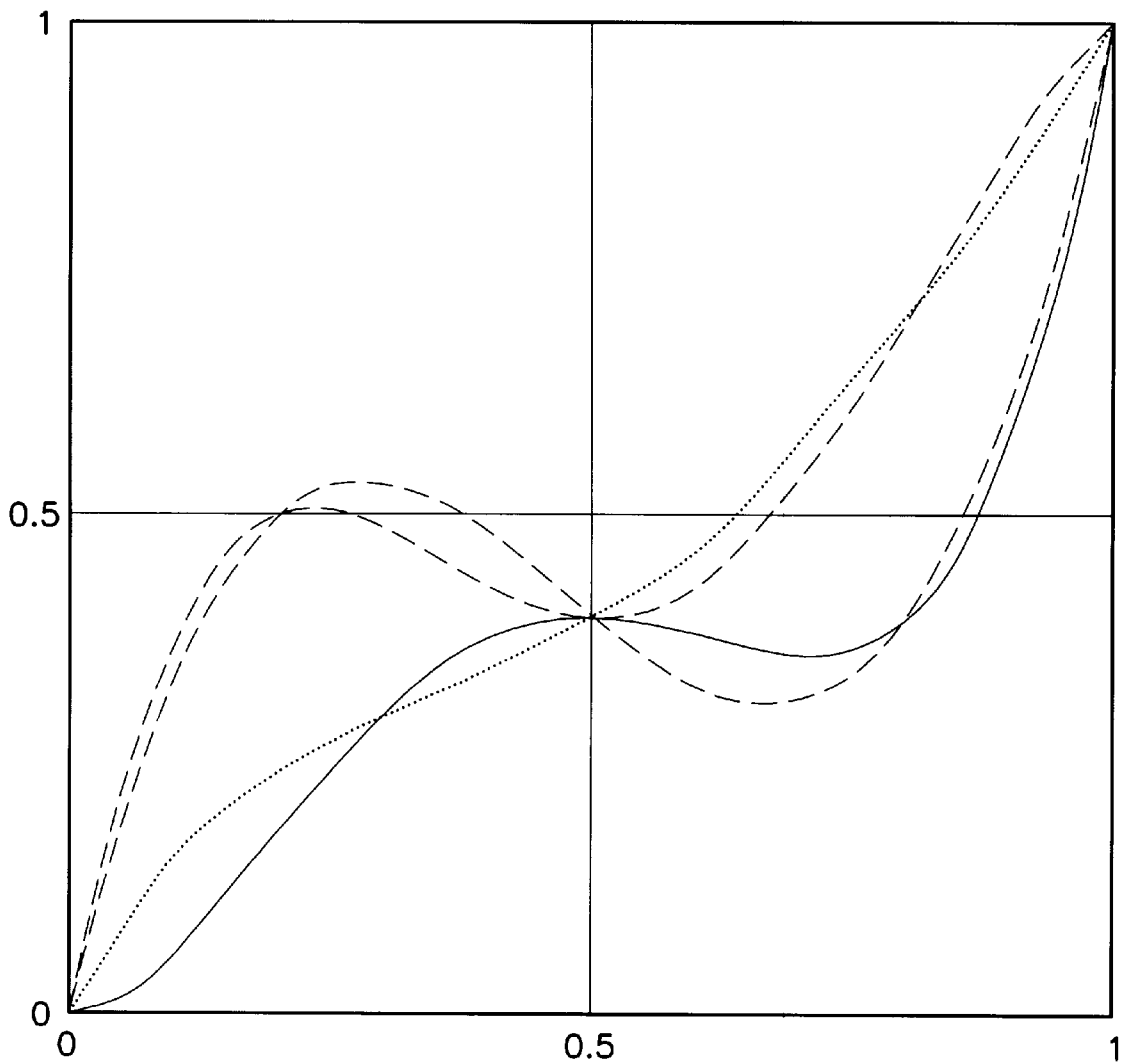
FIG. 9 illustrates exemplary color specification curves which are each defined by five approximation control points.

To illustrate yet another example of the color component curves, referring to FIG. 9, five points define the color component characteristics as expressed in the following fourth degree equation:

$$y = a_0(1-x)^4 + a_1(1-x)^3 x + a_2(1-x)^2 x^2 + a_3(1-x)x^3 + a_4 x^4 \quad (7)$$

where $a_0$, $a_1$, $a_2$, $a_3$ and $_a$ are defined as follows:

$$a_0 = y_1,$$

$$a_4 = y_5$$

$$a_1 = -\frac{x_2 x_3 + x_3 x_4 + x_4 x_2 - 3x_2 x_3 x_4}{x_2 x_3 x_4} \cdot y_1 -$$

$$\frac{x_3 x_4}{x_2(1-x_2)(x_2-x_3)(x_4-x_2)} \cdot y_4 - \frac{x_4 x_2}{x_3(1-x_3)(x_3-x_4)(x_2-x_3)} \cdot$$

$$y_3 - \frac{x_2 x_3}{x_4(1-x_4)(x_4-x_2)(x_3-x_4)} \cdot y_4 -$$

$$\frac{x_2 x_3 x_4}{(1-x_2)(1-x_3)(1-x_4)} \cdot y_5$$

$$a_2 = \frac{x_2 + x_3 + x_4 - 2(x_2 x_3 + x_3 x_4 + x_4 x_3) + 3x_2 x_3 x_4}{x_2 x_3 x_4} \cdot y_1 +$$

$$\frac{(x_3 + x_4 - 2x_3 x_4)}{x_2(1-x_2)(x_2-x_3)(x_4-x_2)} \cdot y_2 + \frac{(x_4 + x_2 - 2x_4 x_2)}{x_3(1-x_3)(x_3-x_4)(x_2-x_3)} \cdot$$

$$y_3 + \frac{(x_2 + x_3 - 2x_2 x_3)}{x_4(1-x_4)(x_4-x_2)(x_3-x_4)} \cdot y_4 +$$

$$\frac{x_2 x_3 + x_3 x_4 + x_4 x_2 - 3x_2 x_3 x_r}{(1-x_2)(1-x_3)(1-x_4)} \cdot y_5$$

$$a_3 = -\frac{(1-x_2)(1-x_3)(1-x_4)}{x_2 x_3 x_4} \cdot y_1 - \frac{(1-x_3)(1-x_4)}{x_2(1-x_2)(x_2-x_3)(x_4-x_2)} \cdot$$

$$y_2 - \frac{(1-x_4)(1-x_2)}{x_3(1-x_3)(x_3-x_4)(x_2-x_3)} \cdot y_3 -$$

$$\frac{(1-x_2)(1-x_3)}{x_4(1-x_4)(x_4-x_2)(x_3-x_4)} \cdot y_4 -$$

$$\frac{x_2 + x_3 + x_4 - 2(x_2 x_3 + x_3 x_4 + x_4 x_2) + 3x_2 x_3 x_4}{(1-x_2)(1-x_3)(1-x_4)} \cdot y_5$$

In the above example, a starting point and an ending point are respectively fixed by (0, 0) and (1, 1). A first middle point has values (0.3, 0.3) or (0.2, 0.5). A second middle point has values (0.4, 0.4). The last point has values (0.8, 0.4) or (0.8, 0.7). Thus, each color component of a given color system is specified by five points. Assuming three color components for the color system, a total of 15 points substantially specifies the color system. This means that only 15 bytes of color information substantially specifies a color system based upon a 8-bit output signal or 256 intensity levels. The above described 15-byte color system specification is especially advantageous for portably specifying a color system.

Figure 10:
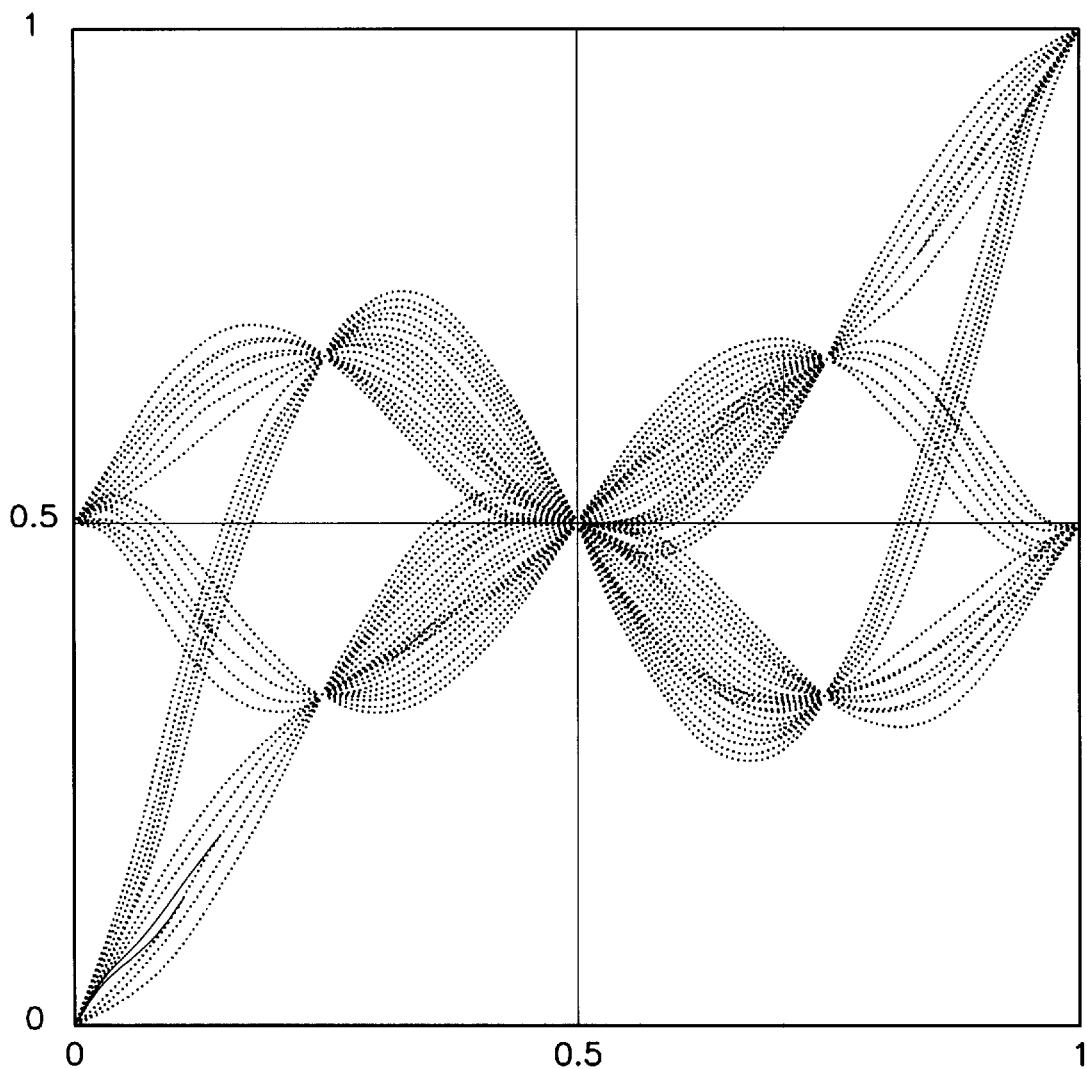
FIG. 10 illustrates exemplary color specification curves which are each defined by five approximation control points and two slopes.

To illustrate the last and most complicated example of the color component curves, referring to FIG. 10, five points and two slopes define a color component characteristic curve. A starting point has values (0,0) or (0, 0.5) while an ending point has values (1, 0.5) or (1, 1). A first middle point has values (0.25, 0.33) or (0.25, 0.67). A second middle point has values (0.5, 0.5). A third middle point has values (0.75, 0.33) or (0.75, 0.67). In addition, a first slope at the starting point $t_a$ has a value 0.5 or 1.5. A second slope at the ending point $t_e$ has a value 0.5 or 1.5.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of portably specifying a color system having color components, comprising the steps of:
    a) determining an input numeric range and an output numeric range for each of the color components, said input numeric range and said output numeric range defining color coordinates for each of the color components;
    b) selecting a predetermined number of approximation control points in said color coordinates for each of the color components;
    c) storing information on said approximation control points, said input numeric range, and said output numeric range for each of the color components, said information defining color system framework information;
    d) interpolating said approximation control points for generating a color line in said color coordinates for each of the color components, wherein each of said approximation control points includes a color component value x within said input numeric range and an intensity value y within said output numeric range, said color line is interpolated by an equation below:

$$y = \sum_{i=0}^{n} a_i (1-x)^{n-1} x^i \quad (1)$$

where a is a control parameter, i is an index to a predetermined number n of said approximation control points; and
    e) visualizing said color line for each of the color components.

2. The method of portably specifying a color system according to claim 1 wherein said predetermined n pairs of said color component value and said intensity value determine said equation (1).

3. The method of portably specifying a color system according to claim 1 wherein said predetermined n pairs of said color component value and said intensity value as well as a predetermined number of slopes t for each specifying a slope of said color line determine said equation (1).

4. The method of portably specifying a color system according to claim 3 wherein said slope t specifies said slope of said color line near a beginning of said input range.

5. The method of portably specifying a color system according to claim 3 wherein said slope t specifies said slope of said color line near an end of said input range.

6. The method of portably specifying a color system according to claim 5 wherein said input range and said output range are normalized between 0 and 1.

7. The method of portably specifying a color system according to claim 1 wherein said step e) additionally visualizes a aggregated color line which is representative of a total of the color components.

8. The method of portably specifying a color system according to claim 1 wherein said step e) includes displaying said interpolated color line on a monitor.

9. The method of portably specifying a color system according to claim 1 wherein said step e) includes printing said interpolated color line on an image-carrying medium.

10. The method of portably specifying a color system according to claim 1 further comprising an additional step of repositioning said selected approximation control points prior to repeating said steps d) and e).

11. The method of portably specifying a color system according to claim 1 further comprising an additional step of f) retrieving said color system framework information for each of the color components prior to said step d).

12. The method of portably specifying a color system according to claim 11 further comprising a step g) of adjusting input color values and output color values of a foreign device based upon said color system framework information.

13. A method of visualizing color system adjustments for a predetermined number of color components, comprising the steps of:
 a) displaying a color image to be adjusted according to predetermined initial color characteristics of each of said color components;
 b) independently visualizing in a two-dimensional representation said color characteristics in a line for each of said color components, said line being approximated by a predetermined number of approximated control points, said color characteristics being defined within a predetermined numeric input range for color component values x and a predetermined numeric output range for intensity values y, a, relation being expressed in an equation below:

$$y = \sum_{i=0}^{n} a_i (1-x)^{n-1} x^i \quad (1)$$

whereis a control parameter, i is an index to a predetermined number n of approximated control points;
 c) adjusting said color characteristics of at least one of said color components based upon said approximated control points; and
 d) updating said color image displayed in said step (a) based upon said color characteristics adjusted in said step c).

14. The method of visualizing color system adjustments according to claim 13 wherein said color characteristics are stored for a later use.

15. The method of visualizing color system adjustments according to claim 13 wherein said predetermined n pairs of said color component values and said intensity values determine said equation (1).

16. The method of visualizing color system adjustments according to claim 13 wherein said predetermined n pairs of said color component values and said intensity values as well as a slope t for specifying determine said equation (1).

17. The method of visualizing color system adjustments according to claim 16 wherein said slope t specifies a slope of said line near a beginning of said input range.

18. The method of visualizing color system adjustments according to claim 16 wherein said slope t specifies a slope of said line near an end of said input range.

19. The method of visualizing color system adjustments according to claim 16 wherein said input range and said output range are normalized between 0 and 1.

20. A system for portably specifying color having color components, comprising:
 a display unit for displaying an input numeric range and an output numeric range for each of the color components, said input numeric range and said output numeric range defining color coordinates for each of the color components;
 an input unit connected to said display unit for selecting at least a predetermined number of approximation control points in said color coordinates for each of the color components;
 a storage unit connected to said input unit for storing information on said approximation control points, said input numeric range and said output numeric range for each of the color components, said information defining color system framework information an interpolating unit connected to said input unit and said display unit for interpolating said approximation control points so as to generate an interpolated color line in said color coordinates based upon an equation below for each of the color components whereby said display unit displays said interpolated color line $$y = \sum_{i=0}^{n} a_i (1-x)^{n-1} x^i \quad (1)$$

where each of said approximation control units includes a color component value x within said input numeric range and an intensity value y within said output numeric range, a is a control parameter, i is an index to a predetermined number n of said approximation control points.

21. The system for portably specifying color according to claim 20 wherein said interpolating unit determines said equation (1) based upon said predetermined n pairs of said color component values and said intensity values.

22. The system for portably specifying color according to claim 21 wherein said interpolating unit determines said equation (1) based upon said predetermined n pairs of said color component values and said intensity values as well as a slope t for specifying an incline of said interpolated color line determine said equation (1).

23. The system for portably specifying color according to claim 22 wherein said slope t specifies said incline of said interpolated color line near a beginning of said input range.

24. The system for portably specifying color according to claim 22 wherein said slope t specifies an incline of said interpolated color line near an end of said input range.

25. The system for portably specifying color according to claim 21 wherein said input range and said output range are normalized between 0 and 1.

26. The system for portably specifying color according to claim 20 wherein said display unit additionally visualizes a aggregated color line which is representative of a total of the color components.

27. The system for portably specifying color according to claim 20 wherein said input unit further comprises an editor for repositioning said selected approximation control points prior.

28. The system for portably specifying color according to claim 20 further comprising a reading unit for retrieving said system for portably specifying color framework information on said approximation control points for each of the color components.

29. The system for portably specifying color according to claim 28 further comprising an interface unit connected to said reading unit for adjusting said color coordinates of a foreign device based upon said color system framework information.

30. An interactive color system editor for visualizing a color system, the color system having a predetermined number of color components, each of the color components being specified by color characteristics, comprising:

a display unit for displaying a color image based upon the color system to be adjusted;

a user interface unit for independently visualizing in a two-dimensional representation said color characteristics of each of said color components within a predetermined numeric input range for color component values x and a predetermined numeric output range for intensity values y and for interactively specifying an adjustment in said color characteristics of at least one of said color components, said color characteristics being expressed by an equation, $$y = \sum_{i=0}^{n} \alpha_i (1-x)^{n-1} x^i \qquad (1)$$

where a is a control parameter, i is an index to a predetermined number n of said approximated control points; and a control unit connected to said display unit and said user interface unit for processing said adjustment so as to generate a signal which causes said color image to reflect said adjustment in said color characteristics.

31. The interactive color system editor according to claim 30 further comprising a storage unit for storing said color characteristics for each of said color components.

32. The interactive color system editor according to claim 30 wherein said user interface unit visualizes said color characteristic in a line with approximation control points along said line for each of said color components, said approximation control points being user adjustable.

33. The interactive color system editor according to claim 30 wherein said predetermined n pairs of said color component values and said intensity values determine said equation (1).

34. The interactive color system editor according to claim 30 wherein said predetermined n pairs of said color component values and said intensity values as well as a slope t for specifying determine said equation (1).

35. The interactive color system editor according to claim 34 wherein said slope t specifies a slope of said line near a beginning of said input range.

36. The interactive color system editor according to claim 34 wherein said slope t specifies a slope of said line near an end of said input range.

37. The interactive color system editor according to claim 30 wherein said input range and said output range are normalized between 0 and 1.

* * * * *